(12) United States Patent
Jung

(10) Patent No.: US 12,556,036 B2
(45) Date of Patent: Feb. 17, 2026

(54) METHOD AND DEVICE FOR ADJUSTING POSITION OF COILS IN WIRELESS POWER TRANSMISSION SYSTEM

(71) Applicant: GE HYBRID TECHNOLOGIES, LLC, Niskayuna, NY (US)

(72) Inventor: Chun Kil Jung, Seoul (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 446 days.

(21) Appl. No.: 15/555,545

(22) PCT Filed: Feb. 25, 2016

(86) PCT No.: PCT/KR2016/001854
§ 371 (c)(1),
(2) Date: Sep. 4, 2017

(87) PCT Pub. No.: WO2016/140462
PCT Pub. Date: Sep. 9, 2016

(65) Prior Publication Data
US 2018/0054086 A1    Feb. 22, 2018

(30) Foreign Application Priority Data
Mar. 5, 2015 (KR) .................. 10-2015-0031038

(51) Int. Cl.
*H02J 50/10* (2016.01)
*H01F 38/14* (2006.01)
(Continued)

(52) U.S. Cl.
CPC .............. *H02J 50/10* (2016.02); *H01F 38/14* (2013.01); *H02J 50/40* (2016.02); *H02J 50/90* (2016.02);
(Continued)

(58) Field of Classification Search
CPC ....................................................... H02J 50/80
See application file for complete search history.

(56) References Cited

U.S. PATENT DOCUMENTS 9,685,814 B1 *   6/2017   Moyer ................... H02J 7/025
2009/0079387 A1 * 3/2009   Jin ......................... H02J 50/60
                                                        320/108
(Continued)

FOREIGN PATENT DOCUMENTS

JP       2015027241        2/2015
KR   1020110034773 A1      4/2011
(Continued)

OTHER PUBLICATIONS

"PCT Application No. PCT/KR2016/001854 International Preliminary Report on Patentability", Sep. 14, 2017, 9 pages.
(Continued)

*Primary Examiner* — Tynese V McDaniel
(74) *Attorney, Agent, or Firm* — DeLizio, Peacock, Lewin & Guerra, LLP

(57) ABSTRACT

The present invention relates to a method and a device for adjusting the position of coils for adaptive coupling in a wireless power transmission system. A wireless power transmission system, according to the present invention, comprises: a wireless power transmission device having a primary coil for generating a magnetic field and transmitting wireless power; and a wireless power reception device having a secondary coil for receiving the wireless power by being coupled to the primary coil, wherein the wireless power transmission device sequentially emits search pings while moving the primary coil, receives a signal strength packet that corresponds to each search ping, and moves the primary coil to a target position in which the coupling degree
(Continued)

of the primary coil and secondary coil is equal to or higher than a fixed threshold value or is relatively the highest.

20 Claims, 7 Drawing Sheets

(51) Int. Cl.
  *H02J 7/00* (2006.01)
  *H02J 50/40* (2016.01)
  *H02J 50/80* (2016.01)
  *H02J 50/90* (2016.01)
  *H04B 5/79* (2024.01)

(52) U.S. Cl.
  CPC ............ *H04B 5/79* (2024.01); *H02J 7/00034* (2020.01); *H02J 50/80* (2016.02)

(56) References Cited

U.S. PATENT DOCUMENTS

| | | |
|---|---|---|
| 2010/0259217 A1 | 10/2010 | Baarman et al. |
| 2011/0074344 A1 | 3/2011 | Park et al. |
| 2012/0212178 A1* | 8/2012 | Kim .................. H02J 50/10 320/108 |
| 2014/0019778 A1 | 1/2014 | Lin |
| 2014/0132207 A1* | 5/2014 | Fisher .................. H02J 50/12 320/108 |
| 2014/0253026 A1 | 9/2014 | Du et al. |
| 2015/0097442 A1* | 4/2015 | Muurinen ............ H04B 5/0037 307/104 |
| 2015/0310722 A1* | 10/2015 | Sousa .................. H02J 50/10 307/104 |
| 2015/0380971 A1* | 12/2015 | Priev .................. H02J 7/0027 320/108 |
| 2016/0056637 A1* | 2/2016 | Hwang .................. H02J 50/10 307/104 |
| 2016/0087448 A1* | 3/2016 | Takahashi ............... H02J 50/60 307/104 |
| 2016/0126749 A1* | 5/2016 | Shichino ................. H02J 50/80 307/104 |
| 2017/0057370 A1* | 3/2017 | Harper .................. H02J 50/80 |
| 2022/0231544 A1* | 7/2022 | Yu ........................... H02J 50/12 |
| 2022/0320913 A1* | 10/2022 | Xu ........................ H02J 7/0047 |
| 2023/0084679 A1* | 3/2023 | Lee ........................ H02J 50/10 320/108 |
| 2023/0127150 A1* | 4/2023 | Wu .................. H02M 3/33573 320/108 |

FOREIGN PATENT DOCUMENTS

| | | |
|---|---|---|
| KR | 1020140002850 A | 1/2014 |
| WO | 2009105615 A2 | 8/2009 |
| WO | 2016140462 | 9/2016 |

OTHER PUBLICATIONS

"PCT Application No. PCT/KR2016/001854 International Search Report and Written Opinion", May 4, 2016, 9 pages.

"Qi System Description Wireless Power Transfer", Wireless Power Consortium, vol. 1:Low Power, Part 1:Interface Definition, Version 1.0.1, Oct. 2010, 88 pages.

"Korea application No. 10-2021-0181568 Request for the Submission of an Opinion", Sep. 2, 2022, 3 pages.

"Korean Application No. 10-2021-0181568 Notification of Reason for Refusal", Mar. 22, 2022, 3 pages.

"Korean Application No. Notification of Reason for Refusal", Mar. 11, 2021, 2 pages.

* cited by examiner

METHOD AND DEVICE FOR ADJUSTING POSITION OF COILS IN WIRELESS POWER TRANSMISSION SYSTEM

CROSS-REFERENCE TO RELATED APPLICATIONS

This application is a national stage of International Application No. PCT/KR2016/001854, filed 25 Feb. 2016, which claims the benefit of priority to Korean Application No. 10-2015-0031038, filed 5 Mar. 2015 in the Korean Intellectual Property Office, the disclosures of which are incorporated herein by reference.

TECHNICAL FIELD

The present invention relates to wireless charging, and more particularly, to a method and apparatus of adjusting a coil location for magnetic field coupling in a wireless power transmission system.

BACKGROUND ART

The wireless power transfer technology is a technology that wirelessly delivers power between a power source and an electronic device. For example, the wireless power transfer technology enables a battery of a wireless terminal to be charged by simply placing a wireless terminal such as a smart phone or a tablet on a wireless charging pad. Thus, compared to a wired charging environment using a typical wired charging connector, the mobility, convenience, and safety can be improved. In addition to wireless charging of wireless terminals, the wireless power transfer technology is attracting attention as a substitute for the existing wired power transfer environment in various fields such as electric vehicles, wearable devices such as Bluetooth earphones or 3D glasses, home appliances, furniture, underground facilities, buildings, medical devices, robots, and leisure.

The wireless power transfer method is also referred to as a contactless power transfer method, a no point of contact power transfer method, or a wireless charging method. The wireless power transmission system includes a wireless power transfer apparatus for supplying electric energy by a wireless power transfer method and a wireless power receiving apparatus for receiving electric energy wirelessly supplied from the wireless power transfer apparatus to charge a battery cell.

In a typical terminal supply method, commercial power is supplied and converted into a voltage and a current corresponding to a battery cell to supply electrical energy to the battery cell through a terminal of the corresponding battery cell. In this terminal supply method, power transfer is performed through a terminal connection between a charger and a terminal. On the other hand, in the wireless power transmission system, due to the characteristics of no point of contact charging, coupling (magnetic induction and/or magnetic resonance) between a primary coil provided in the wireless power transfer apparatus and a secondary coil provided in the wireless power receiving apparatus is required for power transmission, and the wireless power transfer apparatus transmits power to the wireless power receiving apparatus through the magnetic field coupling. Accordingly, there are inconveniences in that matching between the primary coil and the secondary coil is important for smooth wireless power transfer/reception and the wireless power receiving apparatus needs to be located at a designated place in order to maintain optimal charging efficiency. Also, in the wireless power transmission system, the wireless power receiving apparatus may be moved without being fixed. For example, the wireless power receiving apparatus may be moved by an external impact, or the wireless power receiving apparatus may be moved according to the vibration of the wireless power receiving apparatus (e.g., vibration of the cellular phone according to a call signal). Accordingly, there is a limitation in that the wireless power transfer efficiency is lowered or the wireless power transfer is interrupted. In order to overcome this limitation, there is a need for a method of adjusting the location of a coil which can optimize the wireless power transfer efficiency in the wireless power transmission system.

DISCLOSURE

Technical Problem

The present invention provides a method and apparatus for adjusting coil location in a wireless power transmission system.

The present invention also provides a wireless power transfer apparatus including a movable primary coil.

The present invention also provides a wireless power transmission system that supports adaptive coupling.

The present invention also provides a method and apparatus of detecting the location of a secondary coil.

The present invention also provides a method and apparatus of adjusting the location of a primary coil.

The present invention also provides a method and apparatus which detects an optimal location of a primary coil for wireless power transfer and moves the primary coil even when the location of the wireless power receiving apparatus is changed during the wireless power transfer.

Technical Solution

According to an aspect of the present invention, there is provided a wireless power transfer apparatus for performing adaptive coupling, the apparatus comprising: a primary coil coupled to a secondary coil of a wireless power receiving apparatus located in a charging region and transmitting wireless power; a sensing unit for sensing that the wireless power receiving apparatus is located in the charging region; a moving unit for moving the primary coil; a control unit for controlling the primary coil to sequentially emit search pings while moving; and a communication unit receiving signal strength packets corresponding to each search ping, wherein the control unit detects a target location where a degree of coupling is equal to or greater than a predetermined threshold or a relatively largest based on the signal strength packet, and controls the moving unit to move the primary coil to the target location.

According to another aspect of the present invention, there is provided a wireless power transfer method for performing adaptive coupling, the method comprising: sensing a wireless power receiving apparatus; detecting a target location corresponding to a location of a secondary coil of the sensed wireless power receiving apparatus; and moving a primary coil to the detected target location, wherein the detecting of the target location comprises sequentially emitting search pings while moving the primary coil, receiving signal strength packets corresponding to each search ping, and detecting a target location where a degree of coupling of the primary coil and the secondary coil is equal to or greater than a predefined threshold value or is a largest value.

According to another aspect of the present invention, there is provided a wireless power transmission system for performing adaptive coupling, the system comprising: a wireless power transfer apparatus comprising a primary coil for generating a magnetic field and transmitting wireless power; and a wireless power receiving apparatus comprising a secondary coil coupled to the primary coil to receive the wireless power, wherein the wireless power transfer apparatus sequentially emits search pings while moving the primary coil, receives signal strength packets corresponding to each search ping, and moves the primary coil to a target location where a degree of coupling of the primary coil and the secondary coil is equal to or greater than a predefined threshold value or is a largest value.

Advantageous Effects

According to an embodiment of the present invention, a wireless power transfer apparatus can detect a location for optimal charging efficiency, and can improve the degree of coupling of a primary coil and a secondary coil.

Also, according to an embodiment of the present invention, the wireless power transfer apparatus can detect a location for optimal charging efficiency even when the wireless power receiving apparatus moves, and can move the primary coil to the detected location, thereby maintaining the wireless power transfer efficiency.

MODE FOR INVENTION

Figure 1:
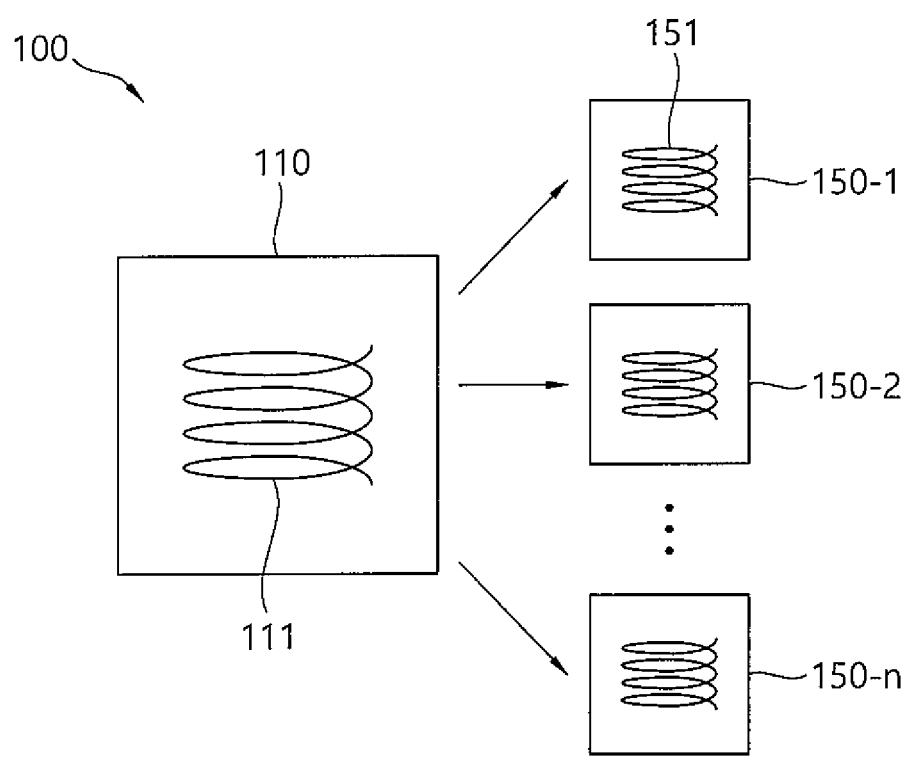
FIG. 1 a view illustrating components of a wireless power transmission system according to an embodiment of the present invention.

Hereinafter, exemplary embodiments of the present invention will be described in detail with reference to the accompanying drawings. In the accompanying drawings, it should be noted that the same components are indicated as the same reference numerals and symbols even if they are shown in different drawings. Also, detailed descriptions related to well-known functions or configurations will be ruled out in order not to unnecessarily obscure subject matters of the present invention.

The term 'wireless power' below is used to mean any type of energy associated with an electric field, a magnetic field, and an electromagnetic field transmitted from a transmitter to a receiver without the use of physical electromagnetic conductors. The wireless power may also be referred to as a power signal, and may denote an oscillating magnetic flux enclosed by a primary coil and a secondary coil. For example, power conversion in a system to wirelessly charge devices including mobile phones, cordless phones, iPods, MP3 players, headsets and the like will be described herein. In general, the basic principles of wireless power transfer include, for example, both magnetic induction method and magnetic resonance method.

FIG. 1 a view illustrating components of a wireless power transmission system according to an embodiment of the present invention.

Referring to FIG. 1, a wireless power transmission system 100 may include a wireless power transfer apparatus 110 and one wireless power reception apparatus 150-1 or n wireless power reception apparatuses 150-1 to 150-$n$.

The wireless power transfer apparatus 110 includes a primary coil 111. The primary coil may include one or more coils. When the primary coil includes a plurality of coils, the plurality of coils may be partially overlapped. The wireless power transfer apparatus 110 may have any suitable form, but one preferred form is a flat platform with a power transfer surface. Here, each of the wireless power receiving apparatuses 150-1 to 150-$n$ may be located on the platform or a charging area (e.g., a charging pad) nearby thereto.

Each of the wireless power receiving apparatuses 150-1 to 150-$n$ is detachable from the wireless power transfer apparatus 110, and each of the wireless power receiving apparatuses 150-1 to 150-$n$ includes the secondary coil 151 coupled with the electromagnetic field generated by the primary coil 111 of the wireless power transfer apparatus 110 when being close to the wireless power transfer apparatus 110. The secondary coil 151 may include one or more coils.

The wireless power transfer apparatus 110 transmits power to the wireless power receiving apparatuses 150-1 to 150-$n$ without direct electrical contact. In this case, it is said that the primary coil 111 and the secondary coil 151 are magnetically coupled (or coupled, inductively coupled, or resonance-inductively coupled) to each other. The primary coil 111 or the secondary coil 151 may have any suitable shape, but may be a copper wire wound around a formation having a high permeability, such ferrite or amorphous metal. For smooth magnetic coupling of the primary coil 111 and the secondary coil 151, the wireless power transfer apparatus 110 may include a moving unit (not shown) for moving the primary coil 111 to a suitable position. For example, the mobile unit may be an actuator.

The wireless power receiving apparatuses 150-1 to 150-$n$ are connected to an external load (not shown, here, also referred to as an actual load of the wireless power receiving apparatus), and supply power wirelessly received from the wireless power transfer apparatus 110 to the external load. For example, the wireless power receiving apparatuses 150-1 to 150-$n$ may each carry received power to an object that consumes or stores power, such as a portable electric or electronic device, or a rechargeable battery cell or battery.

Figure 2:
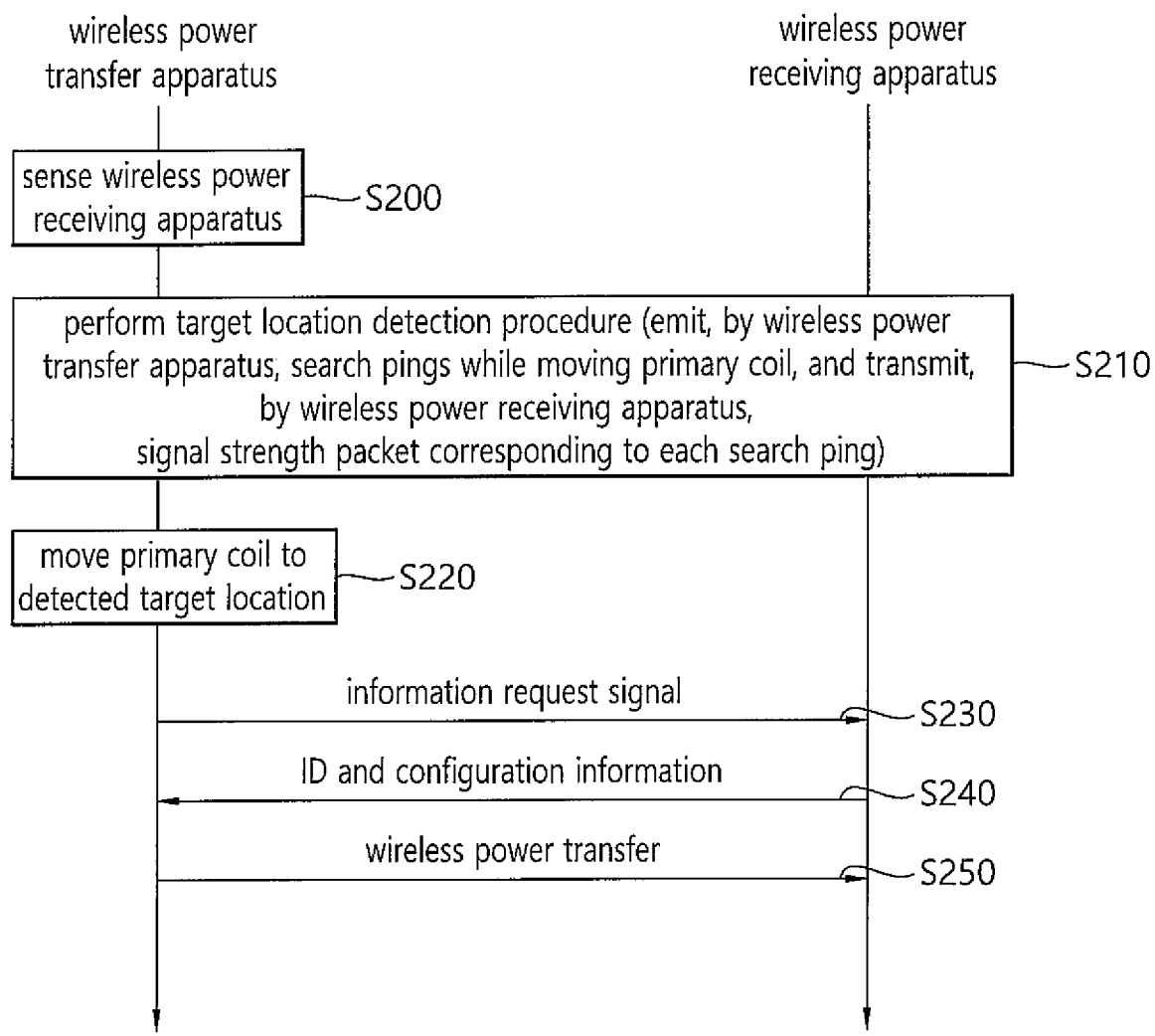
FIG. 2 is a view illustrating a wireless power transfer procedure according to an embodiment of the present invention.

FIG. 2 is a view illustrating a wireless power transfer procedure according to an embodiment of the present invention.

Referring to FIG. 2, the wireless power transfer apparatus detects that the wireless power receiving apparatus is located at a charging region in a standby mode (S200). Here, there may be various methods in which the wireless power transfer apparatus senses the wireless power receiving apparatus, and the present invention is not limited to a specific method. In one example, the wireless power transfer apparatus may periodically emit a specific frequency of analog ping, and based on at least one of the detection current, the resonance shift, and the capacitance change in response to the emitted analog ping, may detect that the wireless power receiving apparatus is located at the charging region. In another example, when the wireless power transfer apparatus periodically transmits a search signal and the wireless power receiving apparatus transmits a response signal based on the search signal, based on the response signal, the wireless power transfer apparatus may detect that the wireless power receiving apparatus is located at the charging region. In another example, when the wireless power transfer apparatus periodically transmits a beacon, the wireless power receiving apparatus may transmit a searching signal or advertisement to the wireless power transfer apparatus as a response thereto. Thus, the wireless power transfer apparatus can detect the wireless power receiving apparatus.

When the wireless power receiving apparatus is detected, the wireless power transfer apparatus performs target location detection (S210). The wireless power transfer apparatus detects the target location for the primary coil corresponding to the location of the wireless power receiving apparatus (or the secondary coil).

The target location detection procedure may be performed as follows.

The wireless power transfer apparatus controls the moving unit to move the primary coil and sequentially emits search pings through the primary coil. In this case, the wireless power transfer apparatus may control the movement path of the moving unit according to a predefined algorithm. For example, the wireless power transfer apparatus may sequentially emit the search pings while sequentially moving the entire area from any one edge of the charging area, or may sequentially emit the search pings while moving in a spiral direction from the center of the charging region. Alternatively, the wireless power transfer apparatus may sequentially emit the search pings while moving in any direction about a location where the wireless power receiving apparatus (or secondary coil) is expected to be located in accordance with any other detection unit or algorithm. Here, the search pings may be emitted at a power intensity smaller than the intensity of the power for the wireless power transfer to reduce the amount of magnetic field radiation.

The wireless power receiving apparatus measures the received signal strength for each of the search pings received through the secondary coil among the search pings that are sequentially transmitted. Here, the received signal strength may be information indicating the degree of coupling of the primary coil and the secondary coil. For example, the received signal strength may be a rectified voltage, an open circuit voltage, received power, and the like. The wireless power receiving apparatus transmits the respective signal strength packets indicating the degree of coupling of the primary coil and the secondary coil to the wireless power transfer apparatus based on the respective received signal strengths. The respective signal strength packets may be transmitted through the secondary coil.

The wireless power transfer apparatus may detect the target location based on the respective signal strength packets. For example, the wireless power transfer apparatus may detect a location where the degree of coupling (or received signal strength) is equal to or greater than a predefined threshold value or a relatively largest value based on the signal strength packets as an optimal target location.

The emission of the search ping and the transmission of the corresponding signal strength packet may be simultaneously or alternately and repeatedly performed. For example, the wireless power transfer apparatus may emit an n-th search ping, the wireless power receiving apparatus may transmit a k-th signal strength packet regarding the n-th search ping, and then the wireless power transfer apparatus may emit a (n+1)-th search ping, the wireless power receiving apparatus may transmit a (k+1)-th signal strength packet regarding the (n+1)-th search ping.

Figure 3:
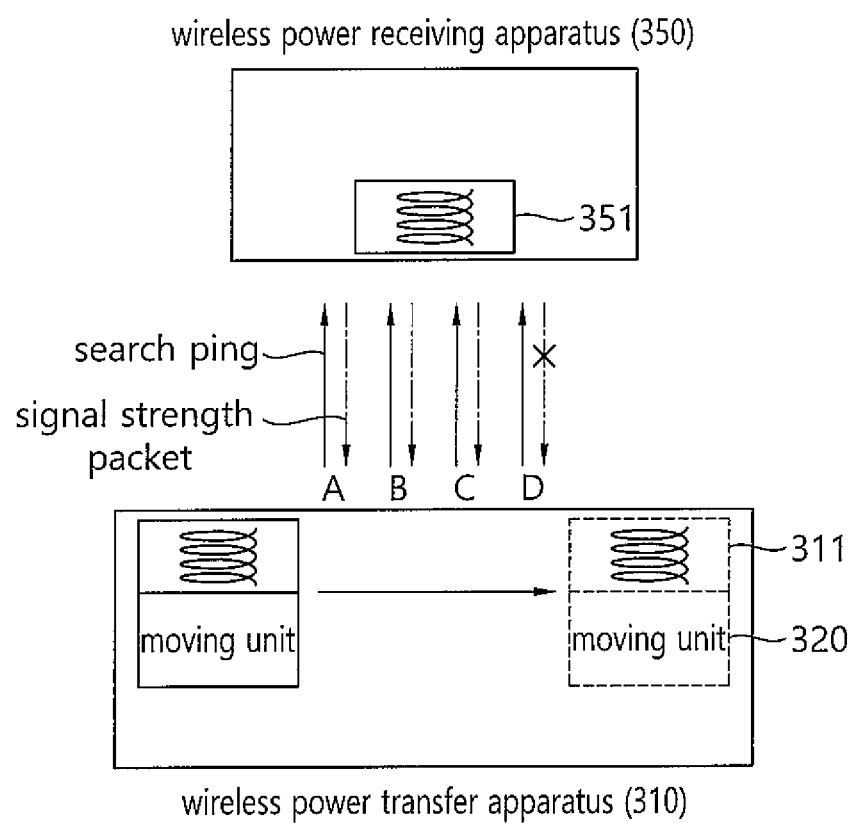
FIG. 3 is a view illustrating a target location detection according to an embodiment of the present invention.

FIG. 3 is a view illustrating a target location detection according to an embodiment of the present invention. In FIG. 3, a wireless power transfer apparatus 310 may include a moving unit 320, and a primary coil 311 may be connected to the moving unit 320 and move together.

Referring to FIG. 3, the moving unit 320 included in the wireless power transfer apparatus 310 moves to a location A, and the primary coil 311 emits an n-th search ping at the Location A. The wireless power receiving apparatus 350 receives the n-th search ping through the secondary coil 351, and transmits the corresponding k-th signal strength packet. The wireless power transfer apparatus 310 determines the degree of coupling at the location A based on the k-th signal strength packet.

The moving unit 320 included in the wireless power transfer apparatus 310 moves to a location B, and the primary coil 311 emits a (n+1)-th search ping at the location B. The wireless power receiving apparatus 350 receives the (n+1)-th search ping through the secondary coil 351, and transmits the corresponding (k+1)-th signal strength packet. The wireless power transfer apparatus 310 determines the degree of coupling at the location B based on the k-th signal strength packet.

The moving unit 320 included in the wireless power transfer apparatus 310 moves to a location C, and the primary coil 311 emits a n+2th search ping at the location C. The wireless power receiving apparatus 350 receives the n+2th search ping through the secondary coil 351, and transmits the corresponding (k+2)-th signal strength packet. The wireless power transfer apparatus 310 determines the degree of coupling at the location C based on the (k+2)-th signal strength packet.

The moving unit 320 included in the wireless power transfer apparatus 310 moves to a location D, and the primary coil 311 emits a (n+3)-th search ping at the location D. When the wireless power receiving apparatus 350 does not receive the n+3th search ping through the secondary coil 351 (e.g., when the primary coil 311 and the secondary coil 312 have a large difference in horizontal location), the received signal strength cannot be measured. Accordingly, a signal strength packet is not generated. That is, the wireless power transfer apparatus 310 does not receive the signal strength packet for the location D, and at the location D, it can be seen that the primary coil 311 and the secondary coil 351 are not coupled (or the degree of coupling is very low).

Based on the k-th signal strength packet, the (k+1)-th signal strength packet, and the (k+2)-th signal strength packet, when the degree of coupling at the location B is relatively large, the wireless power transfer apparatus 310 may detect the location B as the target location. Of course, this is an example. As an example, after detecting the target location, while the moving unit 320 is densely moved around the location B by the control of the wireless power transfer apparatus 31, the primary coil 311 may sequentially emit search pings, and a target location having a more optimal degree of coupling may be detected. Alternatively, while the moving unit 320 is moved in an axial direction different from the existing direction or in an arbitrary direction by the control of the wireless power transfer apparatus 310, the primary coil 311 may sequentially emit searching pings, and a target location having a more optimal degree of coupling may be detected.

Referring again to FIG. 2, the wireless power transfer apparatus moves the primary coil to the target location (S220). The wireless power transfer apparatus may control the moving unit to move the primary coil to the target location.

The wireless power transfer apparatus transmits an information request signal to the wireless power receiving apparatus as a preparation step for wireless power transfer (S230). Here, the information request signal may be a signal for requesting the required power information and the ID of the wireless power receiving apparatus. In one example, the information request signal may be transmitted in a form of data packet message. In another example, the information request signal may be transmitted in a form of digital ping according to predefined criteria between the wireless power transfer apparatus and the wireless power receiving apparatus.

The wireless power receiving apparatus transmits the ID and configuration information to the wireless power transfer apparatus in response to the information request signal (S240). Here, the configuration information may include a maximum amount of power that the wireless power receiving apparatus desires to receive. The ID and configuration information may be transmitted in a form of a data packet message. In an example, an ID packet may be generated in regard to the ID, and a configuration packet may be generated in regard to the configuration information. The ID packet and the configuration packet may be transmitted to the wireless power transfer apparatus, respectively.

The wireless power transfer apparatus configures parameters for power transfer based on the ID and configuration information, and performs wireless power transfer to the wireless power receiving apparatus (S250). That is, the wireless power transfer apparatus creates a power transfer contract based on the ID and configuration information, and performs wireless power transfer to the wireless power receiving apparatus. The step from starting of the wireless power transfer of the wireless power transfer apparatus to the wireless power receiving apparatus to stopping of the wireless power transfer may be referred to as a (wireless) power transfer phase.

The wireless power receiving apparatus may supply the received wireless power to an external load such as a battery.

Meanwhile, the above-described target location detection operation according to an embodiment of the present invention may also be performed in the power transfer phase. This is because, in a wireless power transmission system, a wireless power receiving apparatus is not fixed and is movable. For example, the wireless power receiving apparatus can be moved by an external impact, or the wireless power receiving apparatus can be moved according to the vibration of the wireless power receiving apparatus (e.g., vibration of the cellular phone according to a call signal). Accordingly, there is a limitation in that the wireless power transfer efficiency is lowered or the wireless power transfer is interrupted, and the target location detection and the location adjustment of the primary coil need to be performed.

Figure 4:
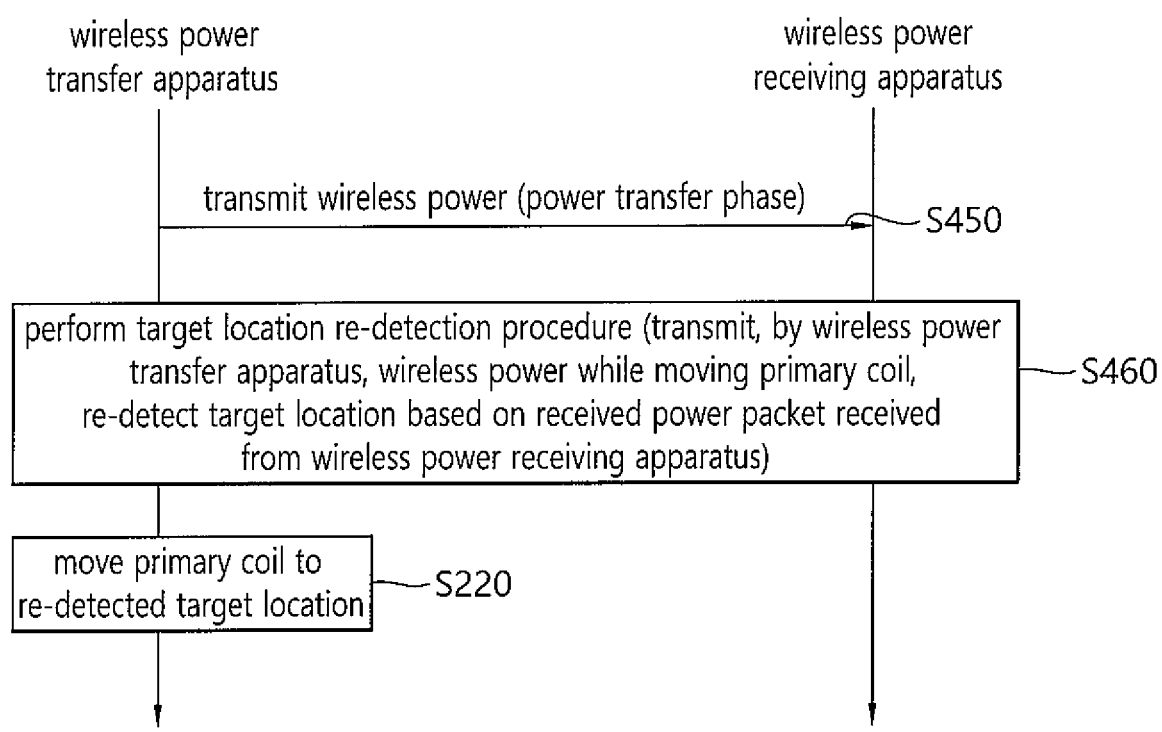
FIG. 4 is a view illustrating another exemplary wireless power transfer procedure according to an embodiment of the present invention.

FIG. 4 is a view illustrating another exemplary wireless power transfer procedure according to an embodiment of the present invention.

Referring to FIG. 4, the wireless power transfer apparatus performs wireless power transfer to the wireless power receiving apparatus in the power transfer phase (S450).

The wireless power transfer apparatus performs target location (re-)detection according to a defined criterion (S460). For example, the wireless power transfer apparatus may perform target location (re-)detection according to a specific period. As another example, the wireless power transfer apparatus may receive a control message from the wireless power receiving apparatus, and may perform the target location (re-)detection based on the control message. Here, the control message may be a message requesting the target location adjustment or the location movement of the primary coil. For example, the control message may be a received power packet message, and a received power value included in the received power packet message may be equal to or less than a predefined threshold value. Here, the received power value may indicate an average power amount received by the wireless power receiving apparatus for a predefined period of time.

The wireless power transfer apparatus may perform wireless power transfer while moving the primary coil, and may perform the target location (re-)detection based on the received power packet received from the wireless power receiving apparatus. In this case, the wireless power transfer apparatus may compare the received power values included in the respective received power packets, and may (re-)detect a location where the received power value is equal to or greater than a predefined threshold value or is relatively largest as an optimal target location.

The wireless power transfer apparatus moves the primary coil to the target location (re-)detected in operation S460 (S470). The wireless power transfer apparatus may control the moving unit to move the primary coil to the (re-)detected target location.

According to an embodiment of the present invention, the wireless power transfer apparatus (re-)detects a location for optimal charging efficiency even when the wireless power receiving apparatus moves, and moves the primary coil to the (re-)detected location, thereby maintaining the wireless power transfer efficiency.

Figure 5:
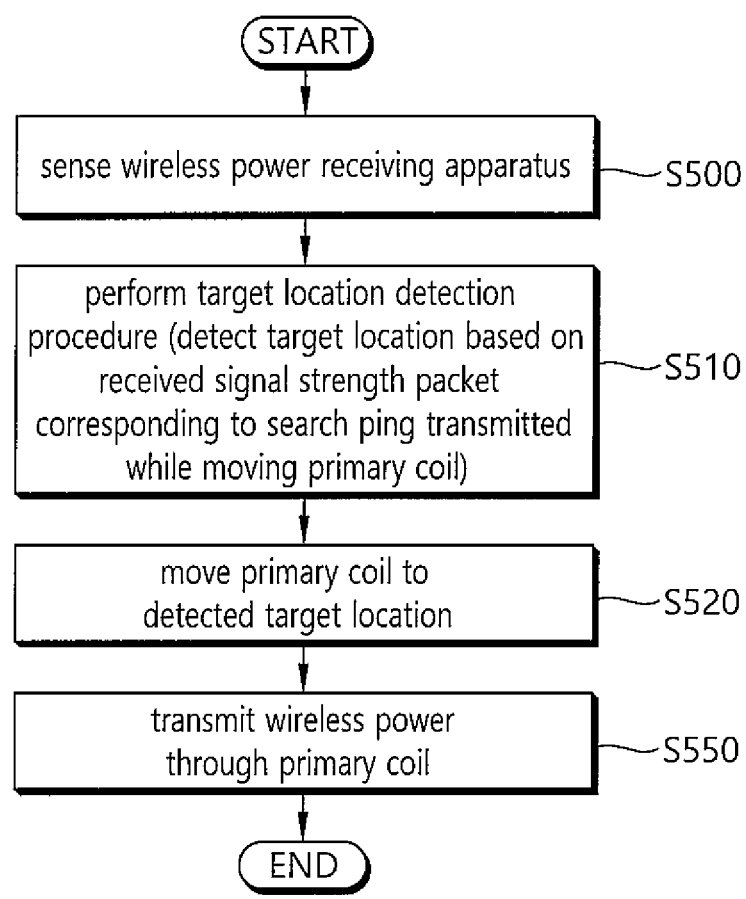
FIG. 5 is a flowchart illustrating a wireless power transfer method according to an embodiment of the present invention.

FIG. 5 is a flowchart illustrating a wireless power transfer method according to an embodiment of the present invention.

Referring to FIG. 5, the wireless power transfer apparatus detects the wireless power receiving apparatus (S500). A method for detecting the wireless power receiving apparatus by the wireless power transfer apparatus is as described in operation S200.

When the wireless power receiving apparatus is detected, the wireless power transfer apparatus performs target location detection (S510). The wireless power transfer apparatus detects the target location for the primary coil corresponding to the location of the wireless power receiving apparatus (or the secondary coil). The target location may be a location for the primary coil in which the degree of coupling of the primary coil and the secondary coil is equal to or more than a predefined value or becomes optimal. The target location detection procedure may include operations of sequentially transmitting the search pings while changing the location of the primary coil by the wireless power transfer apparatus, receiving signal strength packets for each of the search pings from the wireless power receiving apparatus, and performing the target location detection based on the signal strength packets by the wireless power transfer apparatus. Specifically, the target location detection procedure may be performed as described in S210 of FIG. 2 and FIG. 3.

The wireless power transfer apparatus moves the primary coil to the detected target location (S520). The wireless power transfer apparatus may control the moving unit connected to the primary coil to move the primary coil to the target location.

The wireless power transfer apparatus creates a power transfer contract with the wireless power receiving apparatus in a state where the primary coil is moved to the target location, and perform wireless power transfer to the wireless power receiving apparatus through the primary coil (S550). In this case, the wireless power transfer apparatus transmits an information request signal to the wireless power receiving apparatus as a preparation step for wireless power transfer, if necessary, and receives ID and configuration information from the wireless power receiving apparatus. Here, the configuration information may include a maximum amount of power that the wireless power receiving apparatus desires to receive. The wireless power transfer apparatus may create the power transmission contract based on the ID and the configuration information.

Figure 6:
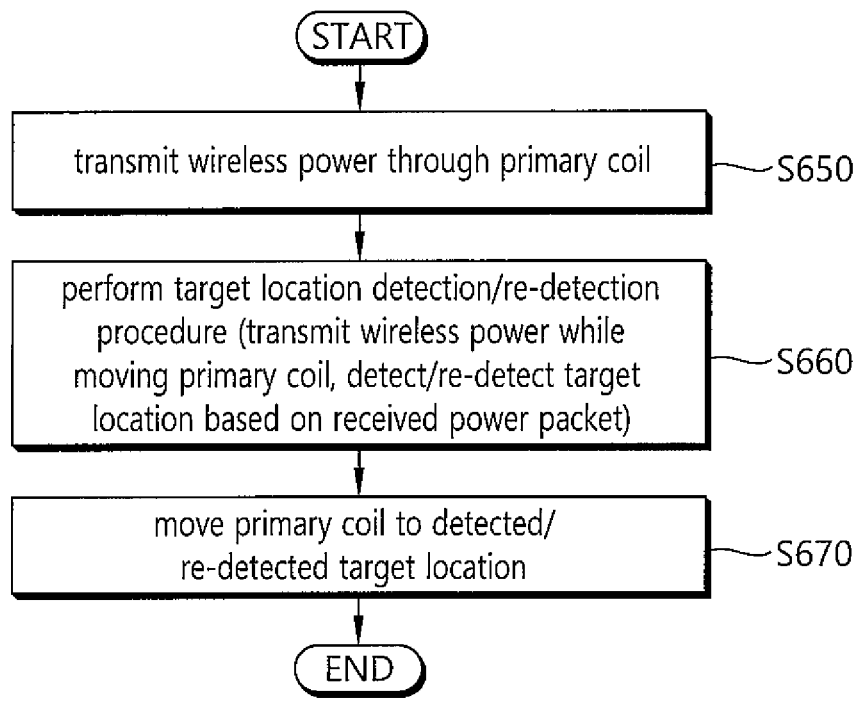
FIG. 6 is a flowchart illustrating a wireless power transfer method according to another embodiment of the present invention.

FIG. 6 is a flowchart illustrating a wireless power transfer method according to another embodiment of the present invention. FIG. 6 shows an example in which target location detection is performed in the power transfer phase.

Referring to FIG. 6, the wireless power transfer apparatus performs wireless power transfer to the wireless power receiving apparatus in the power transfer phase (S650).

The wireless power transfer apparatus performs target location detection/re-detection according to a defined criterion (S660). The target location detection/re-detection procedure may include operations of continuously transmitting wireless power while changing the location of the primary coil by the wireless power transfer apparatus, receiving received power packets from the wireless power receiving apparatus, and performing the target location detection/re-detection based on the received power packets by the wireless power transfer apparatus. In this case, the wireless power transfer apparatus may compare the received power values included in the respective received power packets, and may detect/re-detect a location where the received power value is equal to or greater than a predefined threshold value or is relatively largest as an optimal target location.

For example, the wireless power transfer apparatus may perform target location detection/re-detection according to a specific period. As another example, the wireless power transfer apparatus may receive a control message from the wireless power receiving apparatus, and may perform the target location detection/re-detection based on the control message.

The wireless power transfer apparatus moves the primary coil to the target location detected/re-detected in operation S660 (S670). The wireless power transfer apparatus may control the moving unit to move the primary coil to the detected/re-detected target location. Thus, the wireless power transfer efficiency may be optimized even when the wireless power receiving apparatus moves.

Figure 7:
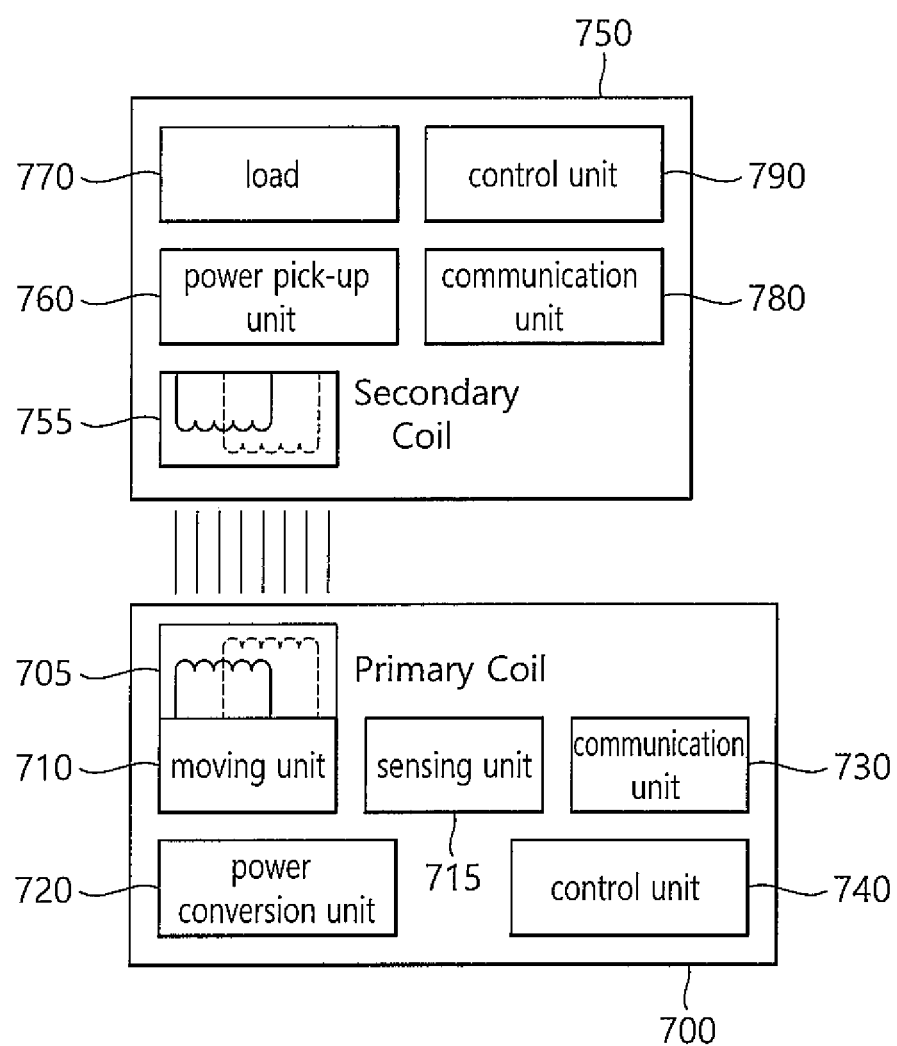
FIG. 7 is a view illustrating a wireless power transfer apparatus and a wireless power receiving apparatus according to an embodiment of the present invention.

FIG. 7 is a view illustrating a wireless power transfer apparatus and a wireless power receiving apparatus according to an embodiment of the present invention.

Referring to FIG. 7, a wireless power transfer apparatus 700 includes a primary coil 705 including at least one coil, a moving unit 710 for moving the primary coil 705, a sensing unit 715 for sensing a wireless power receiving apparatus 750, a power conversion unit 720 connected to the primary coil 705 and applying electrical driving signals to the primary coil 705 to generate an electromagnetic field, a communication unit 730, and a control unit 740.

The wireless power transfer apparatus 700 may have any suitable form, but one preferred form is a flat platform with a power transfer surface. Here, the wireless power receiving apparatus 750 may be located on the platform or a charging area nearby thereto.

The moving unit 710 may move the primary coil 705 by the control of the control unit 740.

The sensing unit 715 senses that the wireless power receiving apparatus 750 is located in the charging region.

The power conversion unit 720 may be a half-bridge inverter or a full-bridge inverter. The power conversion unit 720 may control the frequency, duty cycle, amplitude, etc. of a electric driving signal applied to the primary coil 705 through switching.

The communication unit 730 controls communication between the wireless power transfer apparatus 600 and the wireless power receiving apparatus 650. In one example, the communication unit 730 may communicate with the wireless power receiving apparatus 750 through the primary coil 705. In another example, the communication unit 730 may communicate with the wireless power receiving apparatus 750 through a separate Radio Frequency (RF) communication unit disposed in the communication unit 730 and a communication unit 780 respectively.

The communication unit 730 may receive a signal strength packet, an ID, configuration information, a received power packet, and the like from the wireless power receiving apparatus 750.

The control unit 740 generates a control signal for power control based on the ID and the configuration information, and transmits the control signal to the power conversion unit 720.

The control unit 740 may perform the necessary control operations to implement the present invention as described above. The control unit 740 performs a control operation for target location detection. The control unit 740 may perform the control operation for the target location detection in the standby phase before the wireless power transfer and/or in the power transfer phase during the wireless power transfer.

By the control of the control unit 740, the movement path of the moving unit 710 may be controlled, and the search pings may be sequentially transmitted while the location of the primary coil 705 is changing. The control unit 740 may control the movement path of the moving unit 710 according to a predefined algorithm.

The communication unit 730 may receive a signal strength packet for each of the search pings from the wireless power receiving apparatus 750, and control unit 740 may detect a location where the degree of coupling (or received signal strength) is equal to or greater than a predefined threshold value or a relatively largest value based on the signal strength packets as an optimal target location.

Also, by the control of the control unit 740 during the wireless power transfer, the movement path of the moving unit 710 may be controlled, and the wireless power transfer may be continuously performed while changing the location of the primary coil 705. The communication unit 730 may receive the received power packets from wireless power receiving apparatus 750, and control unit 740 may perform the target location re-detection based on the received power packets. In this case, the control unit 740 may compare the received power values included in the respective received power packets, and may (re-)detect a location of the primary coil 730 where the received power value is equal to or greater than a predefined threshold value or is a relatively largest value as an optimal target location.

The control unit 740 controls the moving unit 710 such that the primary coil 705 can be moved to the detected/re-detected target location. That is, the moving unit 710 is moved to the detected/re-detected target location.

The wireless power receiving apparatus 750 includes a secondary coil 755 coupled to an electromagnetic field generated by the wireless power transfer apparatus 700 when the wireless power receiving apparatus 750 is in the charging region of the wireless power transfer apparatus 700. In this manner, power may be delivered from the wireless power transfer apparatus 700 to the wireless power receiving apparatus 750 without a direct electrical contact. The wireless power receiving apparatus includes a load 770, a power pick-up unit 760 connected to the secondary coil 755 to collect power and supplying power to the load 770, a communication unit 780, and a control unit 790.

The secondary coil 755 includes at least one coil. The secondary coil 755 receives at least one search ping from the wireless power transfer apparatus 700.

The communication unit 780 controls communication between the wireless power transfer apparatus 700 and the wireless power receiving apparatus 750. In one example, the communication unit 780 may communicate with the wireless power transfer apparatus 700 through the secondary coil 755. In another example, the communication unit 780 and the communication unit 730 may each have separate RF communication units, and the communication unit 780 may communicate with the wireless power transfer apparatus 700 through the RF communication unit.

The communication unit 780 may transmit the ID, configuration information, signal strength packet, or received power packet of the wireless power receiving apparatus 750 to the wireless power transfer apparatus 700.

The control unit 790 may control the overall operations of the wireless power receiving apparatus 750. The control unit 790 may perform calculation and processing of various kinds of information, and may control each component of the wireless power receiving apparatus 750.

The control unit 790 detects the received signal strengths for each of the at least one search pings received through the secondary coil 755. Here, each of the received signal strengths may be information indicating the degree of coupling of the primary coil and the secondary coil. For example, the received signal strength may be a rectified voltage, an open circuit voltage, received power, and the like. The control unit 790 may generate the respective signal strength packets indicating the degree of coupling of the primary coil and the secondary coil based on the respective received signal strengths.

The control unit 790 may receive the wireless power signal received through the secondary coil 755, and may detect a received power value. The control unit 790 may generate a received power packet including the received power value.

All of the functions described above may be performed by a processor such as a microprocessor, a controller, a microcontroller, and an Application Specific Integrated Circuit (ASIC) according to software or program codes coded so as to perform the functions. The design, development and implementation of the above codes will be apparent to those skilled in the art based on the description of the present invention.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents. Therefore, the present invention covers all embodiments falling within the scope of the following claims, rather than being limited to the above-described embodiments.

The invention claimed is:

1. A wireless power transfer apparatus comprising:
    a sensing unit to detect a wireless power receiving apparatus in a charging region of the wireless power transfer apparatus;
    a primary coil;
    a moving unit to move the primary coil;
    a communication unit; and
    a control unit configured to:
        before a power transfer phase:
            emit a plurality of search signals at various locations of the primary coil;
            receive responses to the plurality of search signals;
            determine a first target location for the primary coil based on the responses; and
            control the moving unit to move the primary coil to the first target location;
        during the power transfer phase:
            control the primary coil to transfer wireless power to a secondary coil of the wireless power receiving apparatus;
            receive, via the communication unit, a control message from the wireless power receiving apparatus, the control message indicative of a misalignment between the primary coil and the secondary coil;
            initiate a target location re-detection procedure based on the control message;
            determine a second target location for the primary coil based, at least in part, on the target location re-detection procedure; and
            control the moving unit to move the primary coil to the second target location.

2. The wireless power transfer apparatus of claim 1, wherein the control unit is further configured to:
    cause the primary coil to emit the plurality of search signals at one or more locations of the charging region including an n-th search signal at a location A and an (n+1)-th search signal at a location B, and
    determine the first target location of the wireless power receiving apparatus based, at least in part, on the responses, wherein the responses include one or more signal strength packets; and
    wherein the communication unit is further configured to receive, from the wireless power receiving apparatus, the one or more signal strength packets including a k-th signal strength packet corresponding to the n-th search signal and a (k+1)-th signal strength packet corresponding to the (n+1)-th search signal.

3. The wireless power transfer apparatus of claim 2, wherein each signal strength packet indicates a received signal strength of a corresponding search signal received by the wireless power receiving apparatus.

4. The wireless power transfer apparatus of claim 1, wherein the control unit is further configured to determine a degree of coupling of the primary coil and the secondary coil at the various locations based on the responses to the plurality of search signals.

5. The wireless power transfer apparatus of claim 1, wherein the control unit is configured to:
    determine a degree of coupling between the primary coil and the secondary coil based on the responses to the plurality of search signals; and
    determine the first target location where the degree of coupling is at least equal to a threshold.

6. The wireless power transfer apparatus of claim 1, wherein the control message includes a first received power value, and wherein the control unit is further configured to:
   initiate the target location re-detection procedure when the first received power value is equal to or less than a predefined threshold value; and
   determine the second target location where a second received power value of one or more other control messages is equal to or greater than the predefined threshold value or is a relatively largest value among a plurality of received power values of the one or more other control messages.

7. The wireless power transfer apparatus of claim 6, wherein the first and second received power values indicate an average amount of power received by the wireless power receiving apparatus over respective periods of time during the power transfer phase.

8. The wireless power transfer apparatus of claim 1, wherein:
   the primary coil is configured to continuously transfer the wireless power during the power transfer phase;
   the communication unit is configured to receive received power packets during the power transfer phase and obtain received power values from respective received power packets; and
   the control unit is configured to determine an optimal target location of the primary coil where a first received power value of the received power values is equal to or greater than a predefined threshold value or where the first received power value is a relatively largest value from among the received power values.

9. The wireless power transfer apparatus of claim 1, wherein the control message includes at least one of:
   a message requesting a target location adjustment;
   a message requesting location movement of the primary coil; or
   a received power packet indicating a receive power value equal to or less than a threshold value; or
   a message to initiate the target location re-detection procedure.

10. A method of a wireless power transfer apparatus, the method comprising:
    before a power transfer phase:
       detecting a wireless power receiving apparatus in a charging region of the wireless power transfer apparatus;
       emitting a plurality of search signals at various locations of a primary coil of the wireless power transfer apparatus;
       receiving responses to the plurality of search signals;
       determining a first target location for the primary coil based on the responses;
       moving the primary coil to the first target location;
    during the power transfer phase:
       transferring wireless power from the primary coil to a secondary coil of the wireless power receiving apparatus;
       receiving, from the wireless power receiving apparatus, a control message indicative of a misalignment between the primary coil and the secondary coil;
       initiating a target location re-detection procedure based on the control message;
       determining a second target location for the primary coil based, at least in part, on the target location re-detection procedure; and
       moving the primary coil to the second target location.

11. The method of claim 10, wherein detecting the first target location includes:
    emitting the plurality of search signals at one or more locations of the charging region including an n-th search signal at a location A and an (n+1)-th search signal at a location B; and
    receiving the responses, wherein the responses include one or more signal strength packets including a k-th signal strength packet corresponding to the n-th search signal and a (k+1)-th signal strength packet corresponding to the (n+1)-th search signal.

12. The method of claim 11, further comprising:
    emitting a n+2th search signal at location C through the primary coil, and when a (k+2)-th signal strength packet corresponding to the n+2th search signal is not received,
    determining that the primary coil and the secondary coil are not coupled or a degree of coupling of the primary coil and the secondary coil is insufficient at the location C.

13. The method of claim 10,
    determining a degree of coupling of the primary coil and the secondary coil at the various locations based on the responses to the plurality of search signals; and
    determining the first target location where the degree of coupling is at least equal to a threshold.

14. The method of claim 10, wherein the control message includes a first received power value, the method further comprising:
    initiating the target location re-detection procedure when the first received power value is equal to or less than a predefined threshold value; and
    determining the second target location where a second received power value of one or more other control messages is equal to or greater than a predefined threshold value or is a relatively largest value among a plurality of received power values of the one or more other control messages.

15. The method of claim 10, further comprising:
    continuously transferring the wireless power during the power transfer phase;
    receiving one or more received power packets during the power transfer phase and obtaining received power values from respective received power packets; and
    determining an optimal target location of the primary coil where a first received power value of the received power values is equal to or greater than a predefined threshold value or where the first received power value is a relatively largest value from among the received power values.

16. The method of claim 10, wherein the control message includes at least one of:
    a message requesting a target location adjustment;
    a message requesting location movement of the primary coil; or
    a received power packet indicating a receive power value equal to or less than a threshold value; or
    a message to initiate the target location re-detection procedure.

17. A method of a wireless power transfer apparatus, the method comprising:
    before a power transfer phase:
       detecting a wireless power receiving apparatus in a charging region of the wireless power transfer apparatus;

emitting a plurality of search signals at various locations of a primary coil of the wireless power transfer apparatus;
determining a first target location for the primary coil based on responses to the plurality of search signals;
moving the primary coil to the first target location;
during the power transfer phase:
transferring wireless power from the primary coil to a secondary coil of the wireless power receiving apparatus;
receiving, from the wireless power receiving apparatus, a control message indicative of a degradation in wireless power transfer efficiency;
initiating a target location re-detection procedure based on the control message;
determining a second target location for the primary coil to optimize wireless power transfer efficiency based, at least in part, on the target location re-detection procedure; and
moving the primary coil to the second target location.

18. The method of claim 17, wherein the control message indicates coupling misalignment between the primary coil and the secondary coil.

19. The method of claim 17, wherein the control message indicates a received power value of the wireless power receiving apparatus, and the initiating the target location re-detection procedure is based on the received power value being less than expected.

20. The method of claim 17, wherein the control message indicates less power received by the secondary coil than wireless power transferred by the primary coil.

* * * * *